United States Patent
Huo et al.

(10) Patent No.: US 11,870,946 B2
(45) Date of Patent: *Jan. 9, 2024

(54) PREDICTION DECODING METHOD AND APPARATUS

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Shuai Wan, Guangdong (CN); Fuzheng Yang, Guangdong (CN); Qihong Ran, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,874

(22) Filed: Apr. 27, 2022

(65) Prior Publication Data

US 2022/0256179 A1   Aug. 11, 2022

Related U.S. Application Data

(63) Continuation of application No. 17/356,982, filed on Jun. 24, 2021, now Pat. No. 11,412,244, which is a
(Continued)

(51) Int. Cl.
*H04N 19/105* (2014.01)
*H04N 19/159* (2014.01)
(Continued)

(52) U.S. Cl.
CPC ........... *H04N 19/44* (2014.11); *H04N 19/105* (2014.11); *H04N 19/132* (2014.11); *H04N 19/159* (2014.11); *H04N 19/176* (2014.11)

(58) Field of Classification Search
CPC .... H04N 19/11; H04N 19/105; H04N 19/132; H04N 19/159; H04N 19/593
See application file for complete search history.

(56) References Cited

U.S. PATENT DOCUMENTS 10,939,117 B2 *   3/2021   Laroche ................. H04N 19/82
11,012,699 B2 *   5/2021   Choi .................... H04N 19/105
(Continued)

FOREIGN PATENT DOCUMENTS

CN         101904173 A       12/2010
CN         102845063 A       12/2012
(Continued)

OTHER PUBLICATIONS

MDLM template downsampling; Jan. 2019. (Year: 2019).*
(Continued)

*Primary Examiner* — Luis Perez-Fuentes
(74) *Attorney, Agent, or Firm* — PERKINS COIE LLP

(57) ABSTRACT

A prediction decoding method, a prediction decoding apparatus, and a non-transitory computer storage medium are provided. The method includes the following. First multiple neighbouring reference samples of a coding block are determined, where the first multiple neighbouring reference samples include reference samples in a reference row or a reference column neighbouring the coding block. Positions corresponding to K reference samples are determined from a starting position of the reference row or the reference column, where K is a positive integer. Second multiple neighbouring reference samples are determined according to the determined positions corresponding to the K reference samples, where the second multiple neighbouring reference samples include neighbouring reference samples among the first multiple neighbouring reference samples. Prediction
(Continued)

decoding is performed on the coding block according to the second multiple neighbouring reference samples.

18 Claims, 11 Drawing Sheets

Related U.S. Application Data continuation of application No. PCT/CN2019/070147, filed on Jan. 2, 2019.

(51) Int. Cl.
*H04N 19/44* (2014.01)
*H04N 19/132* (2014.01)
*H04N 19/176* (2014.01)

(56) References Cited

U.S. PATENT DOCUMENTS

| | | | |
|---|---|---|---|
| 11,412,244 B2* | 8/2022 | Huo | H04N 19/186 |
| 11,570,458 B2* | 1/2023 | Zhang | H04N 19/186 |
| 2013/0058401 A1 | 3/2013 | Song et al. | |
| 2013/0188703 A1 | 7/2013 | Liu et al. | |
| 2018/0077426 A1 | 3/2018 | Zhang et al. | |
| 2018/0332284 A1 | 11/2018 | Liu et al. | |
| 2018/0376161 A1 | 12/2018 | Chen et al. | |
| 2020/0195930 A1 | 6/2020 | Choi et al. | |
| 2020/0252619 A1 | 8/2020 | Zhang et al. | |
| 2020/0288135 A1 | 9/2020 | Laroche et al. | |
| 2020/0296391 A1* | 9/2020 | Choi | H04N 19/176 |
| 2020/0366933 A1 | 11/2020 | Zhang et al. | |
| 2020/0404282 A1 | 12/2020 | Li et al. | |
| 2021/0136392 A1 | 5/2021 | Ma et al. | |
| 2021/0136409 A1 | 5/2021 | Ma et al. | |
| 2021/0227229 A1* | 7/2021 | Ma | H04N 19/132 |
| 2021/0297656 A1* | 9/2021 | Ma | H04N 19/70 |
| 2021/0314595 A1 | 10/2021 | Zhang et al. | |
| 2021/0337224 A1* | 10/2021 | Huo | H04N 19/147 |
| 2022/0116636 A1 | 4/2022 | Kang et al. | |
| 2022/0256179 A1* | 8/2022 | Huo | H04N 19/132 |
| 2022/0256180 A1* | 8/2022 | Huo | H04N 19/147 |
| 2022/0264132 A1* | 8/2022 | Huo | H04N 19/44 |
| 2022/0264133 A1* | 8/2022 | Huo | H04N 19/105 |
| 2022/0417517 A1* | 12/2022 | Choi | H04N 19/70 |

FOREIGN PATENT DOCUMENTS

| | | |
|---|---|---|
| CN | 103024378 A | 4/2013 |
| CN | 105284109 A | 1/2016 |
| CN | 107046645 A | 8/2017 |
| EP | 3829167 A1 | 6/2021 |
| JP | 2014195142 A | 10/2014 |
| JP | 2022520295 A | 3/2022 |
| RU | 2594291 C2 | 8/2016 |
| WO | 2017214920 A1 | 12/2017 |
| WO | 2018039596 A1 | 3/2018 |
| WO | 2018118940 A1 | 6/2018 |

OTHER PUBLICATIONS

MDLM template downsampling; Hanhart; Jan. 2019. (Year: 2019).*
Multi-directional LM (MDLM); Ma—Oct. 2018. (Year: 2018).*
CCLM-MDLM using simplified coefficient derivation method; Ma—Oct. 2018. (Year: 2018).*
CCLM prediction with single-line neighboring luma samples; Zhang—Oct. 2018. (Year: 2018).
First Examination Report issued in corresponding Indian application No. 202117030040 dated Mar. 4, 2022. 5 pages with English translation.
International search report issued in corresponding international application No. PCT/CN2019/070147 dated Sep. 26, 2019.
Jangwon Choi et al., CE3-related : Reduced number of reference samples for CCLM parameter calculation, dated Oct. 3-12, 2018. 4 pages.
Kai Zhang et al., Enhanced Cross-component Linear Model Intra-prediction, dated Oct. 15-21, 2016. 13 pages.
Multi-directional LM; Ma—Oct. 2018. (Year: 2018).
Non-Final Office Action dated Oct. 13, 2021 of U.S. Appl. No. 17/356,982, filed Jun. 24, 2021.
Notice of Allowance dated Feb. 9, 2022 of U.S. Appl. No. 17/356,982, filed Jun. 24, 2021.
Office Action issued in corresponding RU application No. 2021121547/07(045036) dated Jan. 24, 2022. 8 pages with English translation.
Reduced number of reference samples for CCLM parameter; Choi—Oct. 2017. (Year: 2017).
The first office action issued in corresponding CN application No. 202110714289.3 dated Jun. 20, 2022. 18 pages with English translation.
Hanhart (Interdigital)P et al:"Non-CE3:MDLM template downsampling", 13. JVET Meeting; Marrakech; (The Joint Video Exploration Team of ISO/IEC JTC1/SC29/WG11 and ITU-T SG. 16), No. JVET-M0146-v1, Jan. 1, 2019. 4 pages.
Decision to Grant issued in corresponding RU application No. 2021121547 dated Jun. 1, 2022. 20 pages with English translation.
The extended European search report issued in corresponding European application No. 19907160.6 dated May 10, 2022. 9 pages.
Choi (LGE) J et al: "CE3-related: Reduced number of reference samples for CCLM parameter calculation", 12. JVET Meeting; Macao; JVET of ISO/IEC JTC1/SC29/WG11 and ITU-T SG.16), No. JVET-L0138-v3, Oct. 6, 2018. 5 pages.
The second office action issued in corresponding CN application No. 202110714289.3 dated Nov. 11, 2022. 16 pages with English translation.
Notice of allowance issued in corresponding JP application No. 2021-538695 dated May 12, 2023. (8 pages with translation).
Christophe Gisquet, et al., Non-CE6a: Border-adaptive subsampling for LM mode, Joint Collaborative Team on Video Coding (JCT-VC) of ITU-T SG 16 WP3 and ISO/IEC JTC1/SC29/WG11, JCTVC-H0176_r1, Feb. 3, 2012. 8 pages.
Notice of reasons for refusal issued in corresponding JP application No. 2021-538695 dated Feb. 21, 2023. 8 pages with English translation.
Communication pursuant to Article 94(3) EPC issued in corresponding EP application No. 19907160.6 dated Feb. 10, 2023. 6 pages.
Non-final rejection issued in corresponding U.S. Appl. No. 17/660,917 dated Feb. 28, 2023. 26 pages.
Non-final rejection issued in corresponding U.S. Appl. No. 17/660,970 dated Mar. 1, 2023. 26 pages.
Non-final rejection issued in corresponding U.S. Appl. No. 17/660,992 dated Mar. 2, 2023. 26 pages.

* cited by examiner

PREDICTION DECODING METHOD AND APPARATUS

CROSS REFERENCE TO RELATED APPLICATION(S)

This application is a continuation of U.S. patent application Ser. No. 17/356,982, filed Jun. 24, 2021, which is a continuation of International Application No. PCT/CN2019/070147, filed on Jan. 2, 2019, the disclosures of which are hereby incorporated by reference in their entireties.

TECHNICAL FIELD

This disclosure relates to the technical field of video encoding and decoding, and more particularly to a prediction decoding method, a prediction decoding apparatus.

BACKGROUND

With increase in people's requirements on video display quality, new video application forms such as high-definition video and ultra-high-definition video have emerged. H.265/high efficiency video coding (HEVC) is currently the latest international video compression standard. Although the compression performance of H.265/HEVC is higher than that of the previous-generation video encoding standard, H.264/advanced video coding (AVC), by about 50%, H.265/HEVC still fails to meet requirements for rapid development of video applications, especially new video applications such as ultra-high-definition video and virtual reality (VR).

Video encoding experts group (VCEG) of international telegraph union telecommunication standardization sector (ITU-T) and moving picture experts group (MPEG) of international organization for standardization (ISO)/international electrotechnical commission (IEC) established joint video experts team (JVET) in 2015, to set a next-generation video encoding standard. In April 2018, JVET officially named the next-generation video encoding standard as versatile video coding (VVC), and its corresponding test model is VVC test model (VTM). A linear model-based prediction method has been integrated into VTM, and through such a linear model, a chroma component of a current coding block can be predicted according to a luma component thereof. However, when constructing a linear model, a set of neighbouring reference samples which is constructed by neighbouring reference samples is improper, which results in high search complexity and reduces prediction decoding performance of a video picture.

SUMMARY

In a first aspect, a prediction decoding method is provided. The method includes the following. First multiple neighbouring reference samples of a coding block are determined, where the first multiple neighbouring reference samples include reference samples in a reference row or a reference column neighbouring the coding block. Positions corresponding to K reference samples are determined from a starting position of the reference row or the reference column, where K is a positive integer. Second multiple neighbouring reference samples are determined according to the determined positions corresponding to the K reference samples, where the second multiple neighbouring reference samples include neighbouring reference samples among the first multiple neighbouring reference samples. Prediction decoding is performed on the coding block according to the second multiple neighbouring reference samples.

In a second aspect, a prediction decoding apparatus is provided. The prediction decoding apparatus includes a processor and a memory. The memory is configured to store computer programs which, when executed by the processor, are operable with the processor to: determine first multiple neighbouring reference samples of a coding block, where the first multiple neighbouring reference samples include reference samples in a reference row or a reference column neighbouring the coding block; determine, from a starting position of the reference row or the reference column, positions corresponding to K reference samples, where K is a positive integer; determine second multiple neighbouring reference samples according to the determined positions corresponding to the K reference samples, where the second multiple neighbouring reference samples include neighbouring reference samples among the first multiple neighbouring reference samples; perform prediction decoding on the coding block according to the second multiple neighbouring reference samples.

In a third aspect, a non-transitory computer storage medium is provided. The non-transitory computer storage medium is configured to store programs for prediction decoding which, when executed by at least one processor, are operable with the at least one processor to perform the method described in the first aspect.

Implementations provide a prediction decoding method, a prediction decoding apparatus, and a computer storage medium. According to the method provided herein, the first multiple neighbouring reference samples of the coding block are determined, where the first multiple neighbouring reference samples include reference samples in the reference row or the reference column neighbouring the coding block. The positions corresponding to the K reference samples are determined from the starting position of the reference row or the reference column, where K is a positive integer. The second multiple neighbouring reference samples are determined according to the determined positions corresponding to the K reference samples, where the second multiple neighbouring reference samples include neighbouring reference samples among the first multiple neighbouring reference samples. Prediction decoding is performed on the coding block according to the second multiple neighbouring reference samples.

DETAILED DESCRIPTION

In order for more comprehensive understanding of features and technical solutions of implementations, the following will describe in detail implementations with reference to the accompanying drawings. The accompanying drawings are merely intended for illustration rather than limitation on the disclosure.

In a video picture, a coding block is usually represented by a first colour component, a second colour component, and a third colour component. The above three colour components are respectively a luma component, a blue chroma component, and a red chroma component. The luma component is usually represented by symbol Y, the blue chroma component is usually represented by symbol Cb, and the red chroma component is usually represented by symbol Cr.

According to implementations, the first colour component may be the luma component Y, the second colour component may be the blue chroma component Cb, and the third colour component may be the red chroma component Cr, but the disclosure is not limited in this regard. Currently, a commonly used sampling format is a YCbCr format. The YCbCr format includes the following types which are respectively illustrated in FIG. 1A to FIG. 1C, where a cross (X) represents a sampling point of the first colour component, and a circle (o) represents a sampling point of the second colour component or a sampling point of the third colour component. The YCbCr format includes the following types.

Figure 1C:
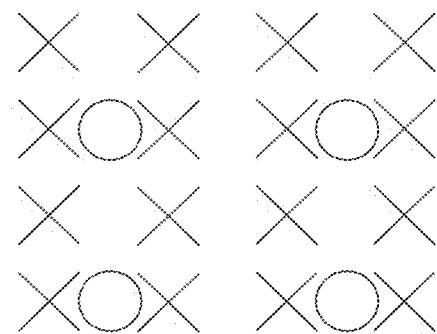
FIGS. 1A-1C are schematic diagrams of sampling formats of a video picture in the related art.
Figure 1B:
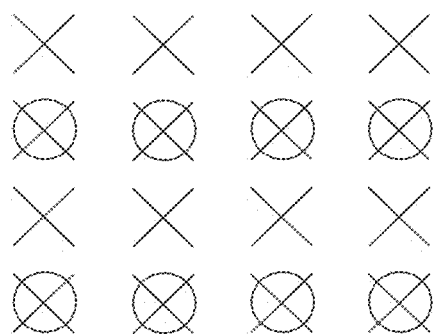
Figure 1A:
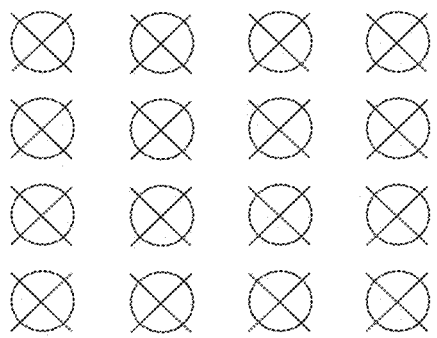

In a 4:4:4 format, as illustrated in FIG. 1A, no down-sampling is performed on the second colour component or the third colour component. Every scan row contains four first colour components, four second colour components, and four third colour components sampled at every four consecutive samples.

Figure 2:
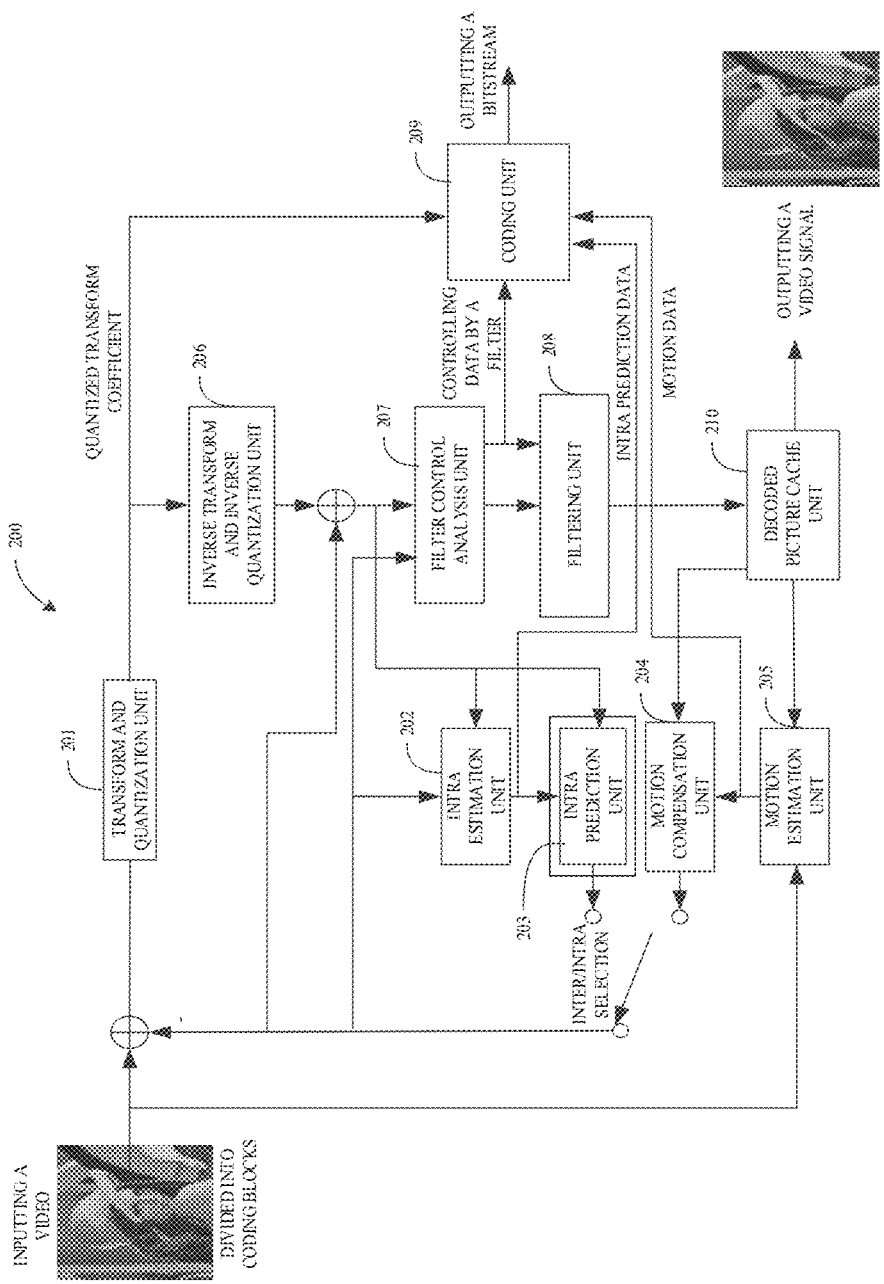
FIG. 2 is a schematic block diagram of a video encoding system according to implementations.

In a 4:2:2 format, as illustrated in FIG. 1B, 2:1 horizontal down-sampling is performed on the first colour component relative to the second colour component or the third colour component, with no vertical down-sampling performed. Every scan row contains four first colour components, two second colour components, and two third colour components sampled at every four consecutive samples.

In a 4:2:0 format, as illustrated in FIG. 1C, 2:1 horizontal down-sampling and 2:1 vertical down-sampling are each performed on the first colour component relative to the second colour component or the third colour component. Every horizontal scan row and every vertical scan row each contain two first colour components, one second colour component, and one third colour component sampled at every two consecutive samples.

In case that the 4:2:0 format of the YCbCr format is adopted in a video picture, if the first colour component of the video picture is a coding block of size 2N×2N, the second colour component or the third colour component of the video picture is a coding block of size N×N, where N is the side length of the coding block. The following will elaborate the 4:2:0 format as an example, but technical solutions of implementations are also applicable to other sampling formats.

In video encoding standard of H.266, in order to further improve encoding and decoding performance, cross-component prediction (CCP) has been extended, and cross-component linear model (CCLM) prediction and multi-directional linear model (MDLM) prediction have been proposed. In H.266, CCLM and MDLM both can achieve prediction between the first colour component and the second colour component, prediction between the first colour component and the third colour component, and prediction between the second colour component and the third colour component.

Taking prediction between the first colour component and the second colour component as an example, in order to reduce redundancy between the first colour component and the second colour component, a CCLM prediction mode is used in a VTM, and the CCLM prediction mode may include a CCLM mode and a MDLM mode. Here, the CCLM mode is also referred to as a linear model (LM) mode. The MDLM mode may include an MDLM_Above (MDLM_A) mode and an MDLM_Left (MDLM_L) mode, where the MDLM_A mode is also referred to as an MDLM_Top (MDLM_T) mode or a CCLM_Top (CCLM_T) mode, and the MDLM_L mode is also referred to as a CCLM_Left (CCLM_L) mode. In general, in VTM 3.0 of VVC, the LM mode, the MDLM_A mode, and the MDLM_L mode are in a competitive relationship. The MDLM_A mode is INTRA_T_CCLM mode, and the MDLM_L mode is INTRA_L_CCLM mode. The difference between the above three modes lies in that, the neighbouring reference samples, which are used for deriving model parameters α and β, is different.

In order to obtain neighbouring reference samples, which are determined for deriving model parameters α and β, more accurate and thus improve prediction decoding performance, implementations provide a prediction decoding method. First multiple neighbouring reference samples are obtained by acquiring neighbouring reference samples of a coding block, where the first multiple neighbouring reference samples include reference samples in a reference row or a reference column neighbouring the coding block. Positions corresponding to K reference samples are determined from a starting position of the reference row or the reference column, where K is a positive integer. Second multiple neighbouring reference samples are obtained according to the determined positions corresponding to the K reference samples, where the second multiple neighbouring reference samples include neighbouring reference samples among the first multiple neighbouring reference samples. That is, the second multiple neighbouring reference samples starts from the $(K+1)^{th}$ reference sample among the first multiple neighbouring reference samples.

Prediction decoding is performed on the coding block according to the second multiple neighbouring reference samples. Since the second multiple neighbouring reference samples are obtained by skipping, among the first multiple neighbouring reference samples, reference samples which are close to the starting position and therefore are not that important, a model parameter(s) constructed according to the second multiple neighbouring reference samples is relatively accurate, which improves prediction decoding performance. In addition, the number of samples of the second multiple neighbouring reference samples is small, which is possible to reduce search complexity, and on the other hand, improve compression efficiency of a video picture and thus decrease bit rate. Implementations will be hereinafter described in detail with reference to the accompanying drawings.

In the INTRA_T_CCLM mode, the reference row neighbouring the coding block refers to an above neighbouring row of the coding block, in the INTRA_L_CCLM mode, the reference column neighbouring the coding block refers a left neighbouring row of the coding block.

Each reference sample corresponds to a luma position, the neighbouring reference samples comprises above neighbouring samples and left neighbouring reference samples FIG. 2 is a schematic block diagram of a video encoding system according to implementations. As illustrated in FIG. 2, the video encoding system 200 includes a transform and quantization unit 201, an intra estimation unit 202, an intra prediction unit 203, a motion compensation unit 204, a motion estimation unit 205, an inverse transform and inverse quantization unit 206, a filter control analysis unit 207, a filtering unit 208, a coding unit 209, a decoded picture cache unit 210, and the like. The filtering unit 208 is configured to implement deblocking (DBK) filtering and sample adaptive offset (SAO) filtering. The coding unit 209 is configured to implement header information coding and context-based adaptive binary arithmatic coding (CABAC). For an input original video signal, a video coding block may be obtained through division by a coding tree unit (CTU), and then residual sample information obtained through intra prediction or inter prediction is processed by the transform and quantization unit 201 to transform the video coding block, which includes transforming the residual information from a pixel domain to a transform domain. An obtained transform coefficient is quantized to further reduce bit rate. The intra estimation unit 202 and the intra prediction unit 203 are configured to perform intra prediction on the video coding block. The intra estimation unit 202 and the intra prediction unit 203 are configured to determine an intra prediction mode to be used for encoding the video coding block. The motion compensation unit 204 and the motion estimation unit 205 are configured to execute intra prediction coding on the received video coding block relative to one or more blocks in one or more reference pictures to provide time prediction information. Motion estimation executed by the motion estimation unit 205 is a process of generating a motion vector, where the motion vector can be used for estimating a motion of the video coding block, and then the motion compensation unit 204 is configured to execute motion compensation according to the motion vector determined by the motion estimation unit 205. After the intra prediction mode is determined, the intra prediction unit 203 is further configured to provide selected intra prediction data to the coding unit 209, and the motion estimation unit 205 is configured to send to the coding unit 209 motion vector data calculated. In addition, the inverse transform and inverse quantization unit 206 is configured to reconstruct the video coding block. A residual block is reconstructed in the pixel domain, a blocking artifact in the reconstructed residual block is removed by the filter control analysis unit 207 and the filtering unit 208, and then the reconstructed residual block is added to a predictive block in a picture in the decoded picture cache unit 210 to generate a reconstructed video coding block. The coding unit 209 is configured to encode various coding parameters and quantized transform coefficients. In a CABAC-based coding algorithm, context contents may be based on neighbouring coding blocks and may be used for encoding information indicative of the determined intra prediction mode to output a bitstream of the video signal. The decoded picture cache unit 210 is configured to store the reconstructed video coding block as a prediction reference. As a video picture is encoded, new reconstructed video coding blocks are continuously generated, and these reconstructed video coding blocks will be stored in the decoded picture cache unit 210.

Figure 3:
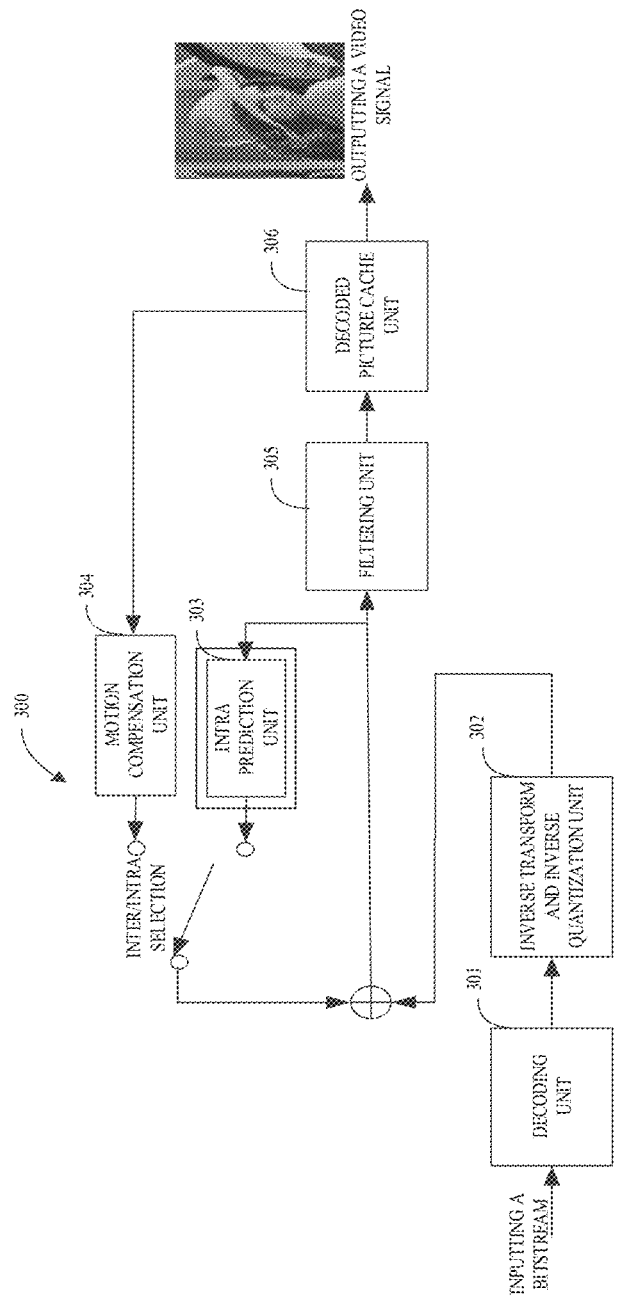
FIG. 3 is a schematic block diagram of a video decoding system according to implementations.

FIG. 3 is a schematic block diagram of a video decoding system according to implementations. As illustrated in FIG. 3, the video decoding system 300 includes a decoding unit 301, an inverse transform and inverse quantization unit 302, an intra prediction unit 303, a motion compensation unit 304, a filtering unit 305, a decoded picture cache unit 306, and the like. The decoding unit 301 can be configured to implement header information decoding and CABAC decoding. The filtering unit 305 can be configured to implement DBK filtering and SAO filtering. After an input video signal is encoded (illustrated in FIG. 2), a bitstream of the video signal is outputted. The bitstream is input into the video decoding system 300 and is first processed by the decoding unit 301 to obtain a decoded transform coefficient. The transform coefficient is processed by the inverse transform and inverse quantization unit 302, such that a residual block is generated in a pixel domain. The intra prediction unit 303 may be configured to generate prediction data of a current video coding block based on a determined intra prediction mode and data of a previous decoded block coming from a current frame or picture. The motion compensation unit 304 is configured to analyze a motion vector and other associated syntax elements to determine prediction information used for the video coding block and configured to use the prediction information to generate a predictive block of the video coding block that is currently being decoded. A residual block from the inverse transform and inverse quantization unit 302 and the corresponding predictive block generated by the intra prediction unit 303 or the motion compensation unit 304 are summed to form a decoded video block. A blocking artifact in the decoded video signal may be removed by the filtering unit 305 to improve video quality. Then the decoded video block is stored in the decoded picture cache unit 306. The decoded picture cache unit 306 is configured to store a reference picture used for subsequent intra prediction or motion compensation and also configured to output a video signal, that is, a restored original video signal is obtained.

Implementations herein can be applied to the intra prediction unit 203 illustrated in FIG. 2 and the intra prediction unit illustrated in FIG. 303. In other words, implementations herein are applicable to both an encoding system and a decoding system, the disclosure is not limited in this regard.

Figure 4:
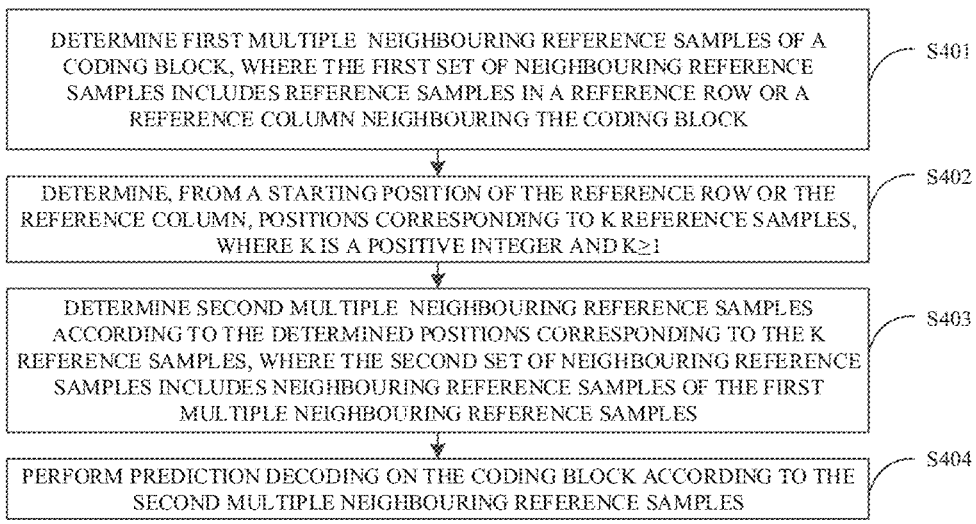
FIG. 4 is a schematic flowchart of a prediction decoding method according to implementations.

Based on the above examples of application scenarios illustrated in FIG. 2 or FIG. 3, FIG. 4 is a schematic flowchart of a prediction decoding method according to implementations. The method includes the following.

At block S401, first multiple neighbouring reference samples of a coding block are determined, where the first multiple neighbouring reference samples include reference samples in a reference row or a reference column neighbouring the coding block.

At block S402, positions corresponding to K reference samples are determined from a starting position of the reference row or the reference column, where K is a positive integer.

At block S403, second multiple neighbouring reference samples are determined according to the determined positions corresponding to the K reference samples, where the second multiple neighbouring reference samples include neighbouring reference samples among the first multiple neighbouring reference samples.

At block S404, prediction decoding is performed on the coding block based on the second multiple neighbouring reference samples.

The coding block is a coding block to be subjected to prediction of a first colour component, prediction of a second colour component, or prediction of a third colour component. The reference row or the reference column neighbouring the coding block may refer to a reference row neighbouring a top side of the coding block, or a reference column neighbouring a left side of the coding block, and may also refer to a reference row or a reference column neighbouring any other side of the coding block, which is not limited herein. For the convenience of description, the following will describe in detail the reference row neighbouring the top side of the coding block as an example of the reference row, and describe in detail the reference column neighbouring the left side of the coding block as an example of the reference column.

The reference samples in the reference row neighbouring the coding block may include reference samples neighbouring a top side and reference samples neighbouring a right top side (also referred to as neighbouring reference samples corresponding to the top side and neighbouring reference samples corresponding to the right top side respectively). The top side refers to the top side of the coding block. The right top side refers to a side which is obtained by extending the top side of the coding block horizontally to the right and has a length equal to the width of a current coding block. The reference samples in the reference column neighbouring the coding block may include reference samples neighbouring a left side and reference samples neighbouring a bottom left side (also referred to as neighbouring reference samples corresponding to the left side and neighbouring reference samples corresponding to the bottom left side respectively). The left side refers to the left side of the coding block. The bottom left side refers to a side which is obtained by extending the left side of the coding block vertically down and has a length equal to the height of the current coding block. However, the disclosure is not limited in this regard.

The K reference samples refer to reference samples which are not that important and therefore can be skipped when obtaining the second multiple neighbouring reference samples. The K reference samples are usually located near the starting position of the reference row or the reference column. The starting position of the reference row refers to a leftmost position of the reference row. The starting position of the reference column refers to a topmost position of the reference column. Since the reference row is in a horizontal direction, "the positions corresponding to the K reference samples are determined from the starting position of the reference row or the reference column" means that the positions corresponding to the K reference samples are determined from the leftmost position of the reference row horizontally to the right. Since the reference column is in a vertical direction, "the positions corresponding to the K reference samples are determined from the starting position of the reference row or the reference column" means that the positions corresponding to the K reference samples are determined vertically down from the topmost position of the reference column. In this way, the first multiple neighbouring reference samples are obtained by acquiring neighbouring reference samples of the coding block, where the first multiple neighbouring reference samples include reference samples in the reference row or the reference column neighbouring the coding block. The positions corresponding to the K reference samples are determined from the starting position of the reference row or the reference column, where K is a positive integer. The second multiple neighbouring reference samples are obtained according to the determined positions corresponding to the K reference samples, where the second multiple neighbouring reference samples include neighbouring reference samples among the first multiple neighbouring reference samples. Prediction decoding is performed on the coding block according to the second multiple neighbouring reference samples. Since the second multiple neighbouring reference samples are obtained by skipping, among the first multiple neighbouring reference samples, reference samples which are close to the starting position and therefore are not that important, a model parameter(s) constructed according to the second multiple neighbouring reference samples is relatively accurate, which improves prediction decoding performance. In addition, the number of samples of the second multiple neighbouring reference samples is small, which is possible to reduce search complexity, and on the other hand, improve compression efficiency of a video picture and thus decrease bit rate.

It can be understood that, the prediction decoding method provided herein is also applicable to a coding system. By determining the second multiple neighbouring reference samples in the coding system, it is possible not only to improve prediction encoding performance of a video picture but also to improve encoding compression efficiency, thereby saving encoding code rate. The following will elaborate only determining of the second multiple neighbouring reference samples in a decoding system as an example.

In some implementations, a prediction mode of the coding block is an MDLM prediction mode, where the MDLM prediction mode includes an MDLM_A mode and an MDLM_L mode.

In some implementations, before the positions corresponding to the K reference samples are determined from the starting position of the reference row or the reference column, the following can be conducted. For the reference row, a value of K is calculated according to a length of the reference row and a first preset proportion, where the first preset proportion corresponds to the reference row, or for the reference column, the value of K is calculated according to a length of the reference column and a second preset proportion, where the second preset proportion corresponds to the reference column.

In other implementations, before the positions corresponding to the K reference samples are determined from the starting position of the reference row or the reference column, the following can be conducted. For the reference row, the value of K is calculated according to a length of the top side of the coding block and the first preset proportion, or for the reference column, the value of K is calculated according to a length of the left side of the coding block and the second preset proportion.

In some implementations, the positions corresponding to the K reference samples are determined from the starting position of the reference row or the reference column as follows. For the reference row, positions corresponding to K consecutive reference samples are determined from the leftmost position of the reference row to the right, or for the reference column, positions corresponding to K consecutive reference samples are determined down from the topmost position of the reference column.

The neighbouring reference samples, which are determined for searching for a maximum neighbouring reference value of the first colour component and a minimum neighbouring reference value of the first colour component, are the second multiple neighbouring reference samples rather than the first multiple neighbouring reference samples, where the second multiple neighbouring reference samples are obtained by skipping (that is, not considering) a preset number of (that is, K) consecutive reference samples from the starting position of the first multiple neighbouring reference samples. As such, reference samples close to the starting position which are not that important are excluded, such that a model parameter(s) constructed according to the second multiple neighbouring reference samples is relatively accurate, thereby improving prediction decoding performance.

The value of K, which represents the number of reference samples, may be preset, for example, 1, 2, 4, or the like, or may be calculated according to the length of the reference row or the reference column neighbouring the coding block and a corresponding preset proportion (i.e. the first preset proportion or the second preset proportion), or may be calculated according to the side length of the coding block and the a corresponding preset proportion. However, the value of K may be set according to actual needs in practice and will not be limited herein. A preset proportion corresponding to the reference row neighbouring the coding block is represented by the first preset proportion. A preset proportion corresponding to the reference column neighbouring the coding block is represented by the second preset proportion. The first preset proportion and the second preset proportion may have the same value or have difference values, which is not limited herein.

It can be understood that, for the MDLM_A mode applied to all reference samples in the reference row (that is, all neighbouring reference samples corresponding to the top side and the right top side) or the MDLM_L mode applied to all reference samples in the reference column (that is, all neighbouring reference samples corresponding to the left side and the bottom left side), the side length of the coding block is N (in the MDLM_A mode, N is the width of the coding block, that is, the length of the top side; and in the MDLM_L mode, N is the height of the coding block, that is, the length of the left side). For blocks to-be-decoded of different side lengths, the value of K can be directly acquired according to table 1. Table 1 shows an example of the number of reference samples (K) when determining the second multiple neighbouring reference samples in the MDLM mode. In table 1, N1 represents the number of samples of the first multiple neighbouring reference samples, N2 represents the number of samples of the second multiple neighbouring reference samples, and K represents a preset number of neighbouring reference samples that are skipped.

TABLE 1

| Side length N | N₁ | N₂ | K |
|---|---|---|---|
| 2 | 4 | 3 | 1 |
| 4 | 8 | 6 | 2 |
| 8 | 16 | 12 | 4 |
| 16 | 32 | 24 | 8 |
| 32 | 64 | 48 | 16 |

In the MDLM_A mode, when all reference samples in the reference row (that is, all neighbouring reference samples corresponding to the top side and all neighbouring reference samples corresponding to the right top side) are available, the second multiple neighbouring reference samples can be obtained in the following two manners.

Manner 1: Taking the length of the reference row and the first preset proportion as an example, supposing that the first preset proportion is ¼, the side length of the coding block (that is, the number of reference samples neighbouring the top side) is 8, and the length of the reference row (that is, the total number of reference samples neighbouring the top side and the right top side) is 16, the value of K is 4. In other words, among the neighbouring reference samples corresponding to the top side and the right top side, the remaining ¾ of reference samples (that is, 12 reference samples), which are close to a rightmost position, constitute the second multiple neighbouring reference samples used for deriving model parameters α and β.

Manner 2: Taking the length of the top side of the coding block and the first preset proportion as an example, supposing that the first preset proportion is ½, the length of the top side of the coding block (that is, the number of reference samples neighbouring the top side) is 8, the value of K is 4. In other words, among the neighbouring reference samples corresponding to the top side and the right top side, the remaining ¾ of reference samples (that is, 12 reference samples), which are close to the rightmost position, constitute the second multiple neighbouring reference samples used for deriving model parameters α and β.

Figure 5:
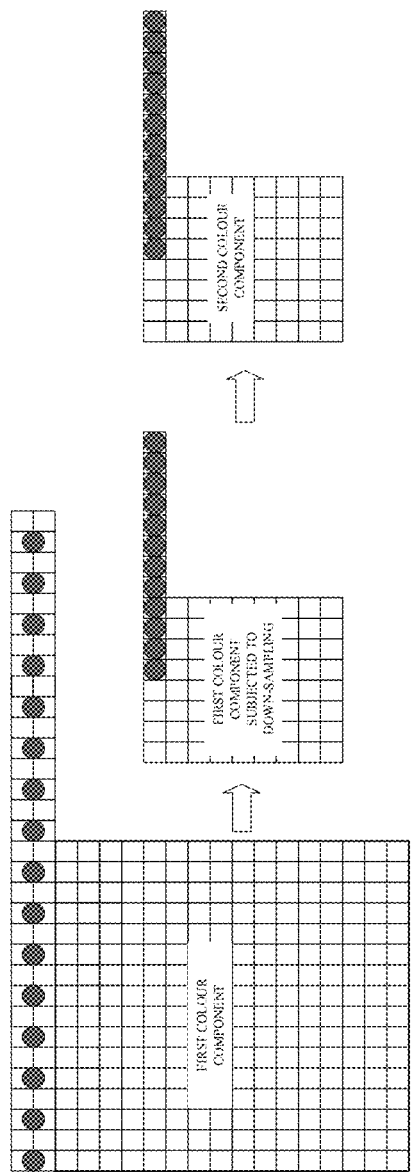
FIG. 5 is a schematic diagram illustrating selection of neighbouring reference samples in a multi-directional linear model_above (MDLM_A) mode according to implementations.

As an example, FIG. 5 is a schematic diagram illustrating selection of neighbouring reference samples in the MDLM_A mode according to implementations. As illustrated in FIG. 5, the coding block is in a square shape, and gray closed circles represent selected neighbouring reference samples of the coding block. Down-sampling needs to be performed on the first colour component, and as such, the first colour component subjected to down-sampling has the same resolution as the second colour component. Supposing that the first preset proportion is ¼, and the length of the reference row (that is, the total number of reference samples neighbouring the top side and the right top side) is 16, the value of K is 4. In other words, for each of the first colour component and the second colour component, positions of 4 consecutive reference samples are determined from the leftmost position of the reference row to the right, and the 4 reference samples are skipped. The remaining ¾ of reference samples (that is, 12 reference samples), which are close to the rightmost position, constitute the second multiple neighbouring reference samples used for deriving model parameters α and β.

Alternatively, the first preset proportion may be ⅛ or ½. Different first preset proportions correspond to different values of K, and the disclosure is not limited in this regard.

In the MDLM_A mode, in addition to a general scenario in which all reference samples in the reference row (that is, all neighbouring reference samples corresponding to the top side and the right top side) are available, there are also some exceptions, and the following will describe in detail three exceptions.

Exception 1: When neighbouring samples corresponding to a top side of the coding block are not available, there is no neighbouring reference sample. Model parameter α is set to be 0, and model parameter β is set to be an intermediate value of the second colour component, that is, 512. In other words, a prediction value of the second colour component corresponding to each sample in the current coding block is 512.

Exception 2: The neighbouring samples corresponding to the top side of the coding block are available, but neighbouring samples corresponding to a right top side of the coding block are not available. For manner 1 described above, the length of the reference row (the number of reference samples neighbouring the top side only) is 8, the first preset proportion is ¼, and the value of K is 2. In other words, among neighbouring reference samples corresponding to the top side of the coding block, the remaining ¾ of reference samples (that is, 6 reference samples), which are close to the rightmost position, constitute the second multiple neighbouring reference samples used for deriving model parameters α and β. For manner 2 described above, the length of the top side (that is, the number of reference samples neighbouring the top side) is 8, the first preset proportion is ½, and the value of K is 4. In other words, among neighbouring reference samples corresponding to the top side of the coding block, the remaining ½ of reference samples (that is, 4 reference samples), which are close to the rightmost position, constitute the second multiple neighbouring reference samples used for deriving model parameters α and β.

Exception 3: When all neighbouring samples corresponding to the top side of the coding block and all neighbouring samples corresponding to the right top side of the coding block are available, the second multiple neighbouring reference samples used for deriving model parameters α and β are determined in manner 1 or manner 2 described above.

In the MDLM_L mode, when all reference samples in the reference column (that is, all neighbouring reference samples corresponding to the left side and all neighbouring reference samples corresponding to the bottom left side) are available, the second multiple neighbouring reference samples can be obtained in the following two manners.

Manner 3: Taking the length of the reference column and the second preset proportion as an example, supposing that the second preset proportion is ¼, the side length of the coding block (that is, the number of reference samples neighbouring the left side) is 8, and the length of the reference column (that is, the total number of reference samples neighbouring the left side and the bottom left side) is 16, the value of K is 4. In other words, among neighbouring reference samples corresponding to the left side and the bottom left side, the remaining ¾ of reference samples (that is, 12 reference samples), which are close to a bottommost position, constitute the second multiple neighbouring reference samples used for deriving model parameters α and β.

Manner 4: Taking the length of the left side of the coding block and the second preset proportion as an example, supposing that the second preset proportion is ½, the length of the left side of the coding block (that is, the number of reference samples neighbouring the left side) is 8, the value of K is 4. In other words, among neighbouring reference samples corresponding to the left side and the bottom left side, the remaining ¾ of reference samples (that is, 12 reference samples), which are close to the bottommost position, constitute the second multiple neighbouring reference samples used for deriving model parameters α and β.

Figure 6:
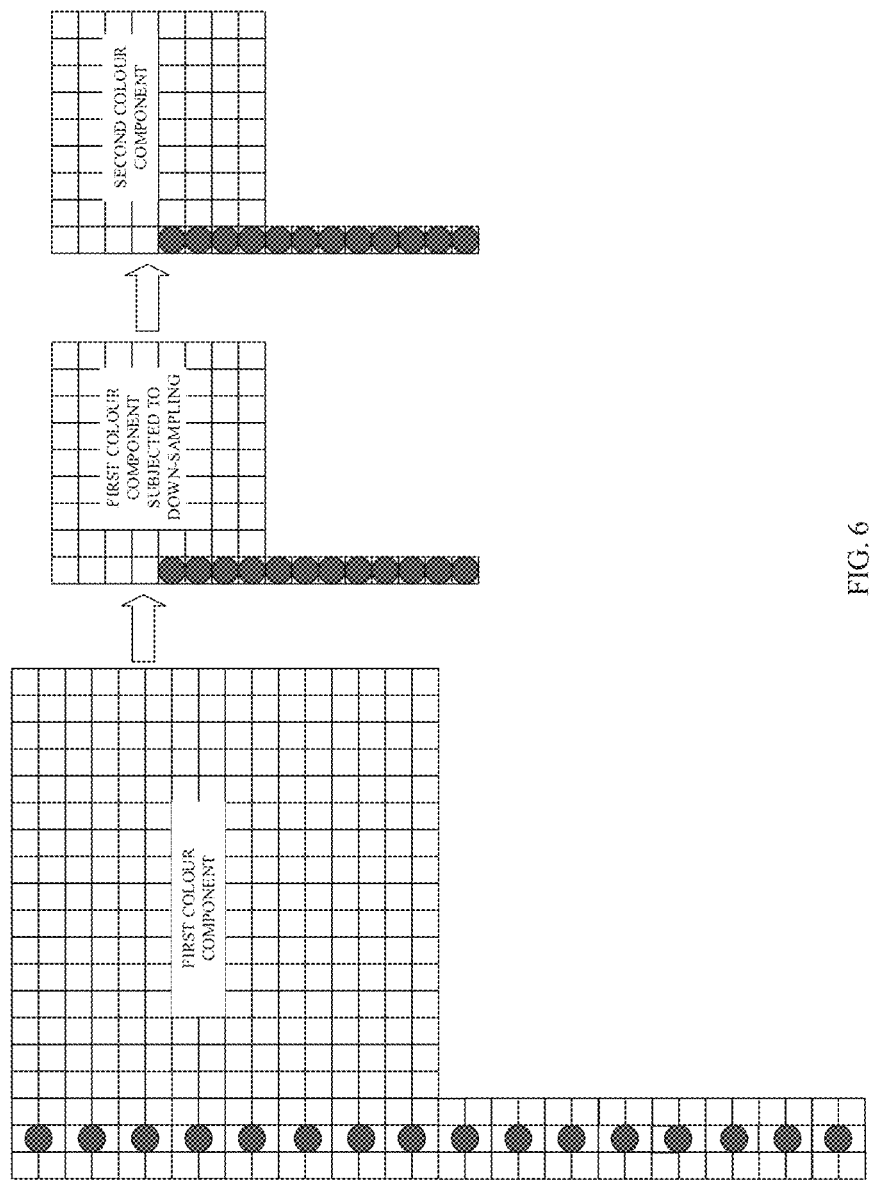
FIG. 6 is a schematic diagram illustrating selection of neighbouring reference samples in an MDLM_Left (MDLM_L) mode according to implementations.

As an example, FIG. 6 is a schematic diagram illustrating selection of neighbouring reference samples in the MDLM_L mode according to implementations. As illustrated in FIG. 6, the coding block is in a square shape, and gray closed circles represent selected neighbouring reference samples of the coding block. Down-sampling needs to be performed on the first colour component, and as such, the first colour component subjected to down-sampling has the same resolution as the second colour component. Supposing that the second preset proportion is ¼, the length of the reference column (that is, the total number of reference samples neighbouring the left side and the bottom left side) is 16, the value of K is 4. In other words, for each of the first colour component and the second colour component, positions of 4 consecutive reference samples are determined down from the topmost position of the reference column, and the 4 reference samples are skipped. The remaining ¾ of reference samples (that is, 12 reference samples), which are close to the bottommost position, constitute the second multiple neighbouring reference samples used for deriving model parameters α and β.

Alternatively, the second preset proportion may be ⅛ or ½. Different second preset proportions correspond to different values of K, and the disclosure is not limited in this regard.

In the MDLM_L mode, in addition to a general scenario in which all reference samples in the reference column (that is, all neighbouring reference samples corresponding to the left side and the bottom left side) are available, there are also some exceptions, and the following will describe in detail three exceptions.

Exception 1: When neighbouring samples corresponding to a left side of the coding block are not available, there is no neighbouring reference sample. Model parameter α is set to be 0, and model parameter β is set to be an intermediate value of the second colour component, that is, 512. In other words, a prediction value of the second colour component corresponding to each sample in the current coding block is 512.

Exception 2: The neighbouring samples corresponding to the left side of the coding block are available, but neighbouring samples corresponding to a bottom left side of the coding block are not available. For manner 3 described above, the length of the reference column (that is, the number of reference samples neighbouring the left side only) is 8, the second preset proportion is ¼, and the value of K is 2. In other words, among neighbouring reference samples corresponding to the left side, the remaining ¾ of reference samples (that is, 6 reference samples), which are close to the bottommost position, constitute the second multiple neighbouring reference samples used for deriving model parameters α and β. For manner 4 described above, the length of the left side (that is, the number of reference samples neighbouring the left side) is 8, the second preset proportion is ½, and the value of K is 4. In other words, among neighbouring reference samples corresponding to the left side, the remaining ½ of reference samples (that is, 4 reference samples), which are close to the bottommost position, constitute the second multiple neighbouring reference samples used for deriving model parameters α and β.

Exception 3: When all neighbouring samples corresponding to the left side of the coding block and all neighbouring samples corresponding to the bottom left side of the coding block are available, the second multiple neighbouring reference samples used for deriving model parameters α and β are determined in manner 3 or manner 4 described above.

In some implementations, for the reference row, before the positions corresponding to the K reference samples are determined, the method further includes the following. Positions corresponding to i consecutive reference samples are determined from a leftmost position of the reference row to the right. Positions corresponding to j consecutive reference samples are determined from a rightmost position of the reference row to the left, where $1 \leq i < K$ and $j = K - i$.

In other implementations, for the reference column, before the positions corresponding to the K reference samples are determined, the method further includes the following. Positions corresponding to p consecutive reference samples are determined down from a topmost position of the reference column. Positions corresponding to q consecutive reference samples are determined up from a bottommost position of the reference column, where 1≤p<K, and q=K−p.

For each of the MDLM_A mode and the MDLM_L mode, some reference samples which are close to the starting position and some reference samples which are close to an ending position of the reference row or the reference column can be excluded, and the second multiple neighbouring reference samples include only reference samples corresponding to middle positions of the reference row or the reference column (that is, positions not close to the starting position and those close to the ending position). The value of i may be equal or unequal to that of j. The value of p may be equal or unequal to that of q. In practice, the value of i, the value of j, the value of p, and the value of q may be determined according to actual needs, and the disclosure is not limited in this regard.

Figure 7:
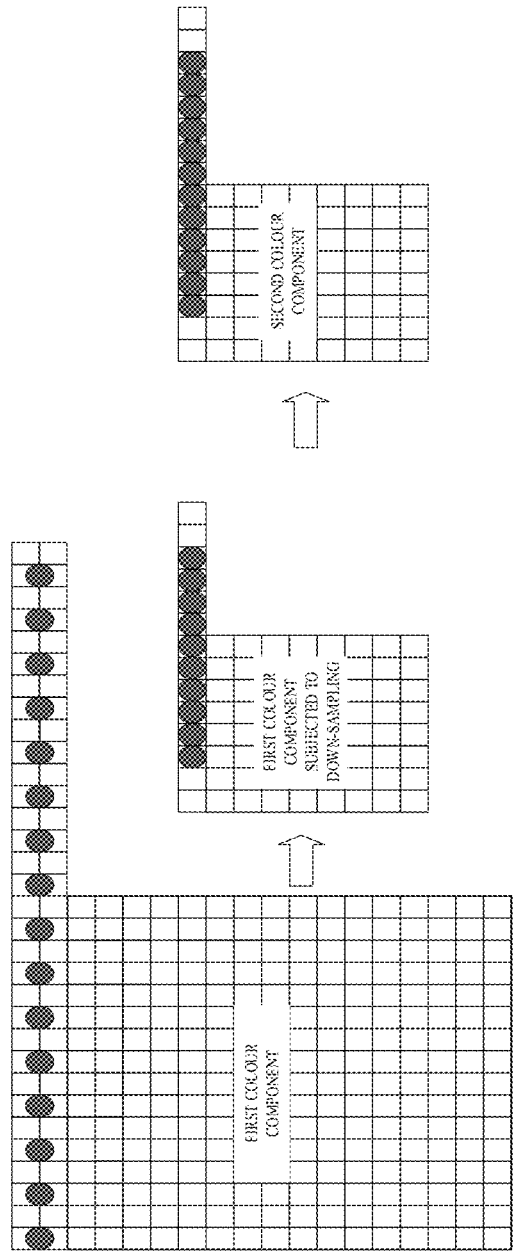
FIG. 7 is a schematic diagram illustrating selection of neighbouring reference samples in an MDLM_A mode according to other implementations.

Taking the MDLM_A mode as an example, FIG. 7 is a schematic diagram illustrating selection of neighbouring reference samples in the MDLM_A mode according to other implementations. As illustrated in FIG. 7, the coding block is in a square shape, and gray closed circles represent selected neighbouring reference samples of the coding block. Down-sampling needs to be performed on the first colour component, and as such, the first colour component subjected to down-sampling has the same resolution as the second colour component. Supposing that the first preset proportion is ¼, and the length of the reference row (that is, the total number of reference samples neighbouring the top side and the right top side) is 16, the value of K is 4. Supposing that the number of samples to be skipped which are close to one end of the reference row is the same as the number of samples to be skipped which are close to the other end of the reference row, in other words, ⅛ of reference samples, which are close to the starting position of the reference row, and ⅛ of reference samples, which are close to the ending position of the reference row, are skipped, that is, i=j=2. Therefore, for each of the first colour component and the second colour component, positions corresponding to 2 consecutive reference samples are determined from the leftmost position of the reference row to the right, and positions corresponding to 2 consecutive reference samples are determined from the rightmost position of the reference row to the left. Then the 4 reference samples thus determined are skipped. The remaining ¾ of reference samples (that is, 12 reference samples), which are located at middle positions of the reference row, constitute the second multiple neighbouring reference samples used for deriving model parameters α and β.

Figure 8:
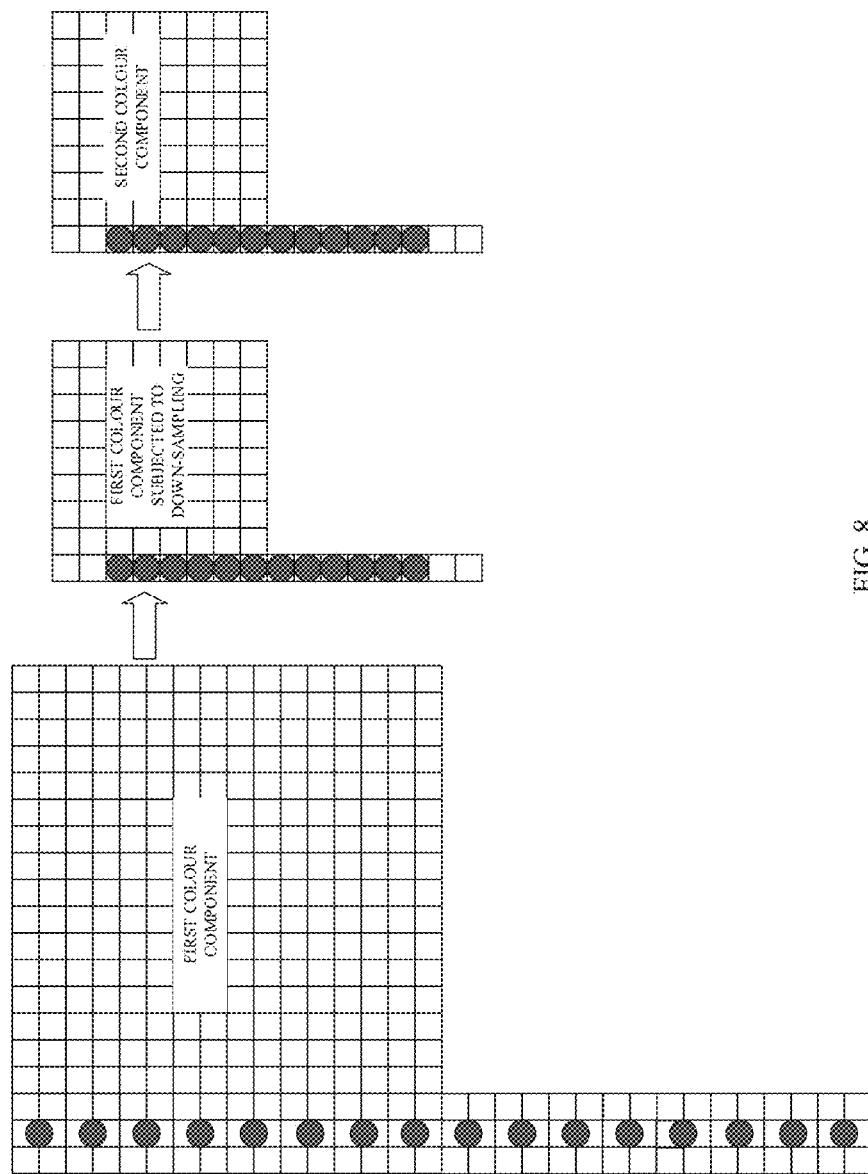
FIG. 8 is a schematic diagram illustrating selection of neighbouring reference samples in an MDLM_L mode according to other implementations.

Taking the MDLM_L mode as an example, FIG. 8 is a schematic diagram illustrating selection of neighbouring reference samples in an MDLM_L mode according to other implementations. As illustrated in FIG. 8, the coding block is in a square shape, and gray closed circles represent selected neighbouring reference samples of the coding block. Down-sampling needs to be performed on the first colour component, and as such, the first colour component subjected to down-sampling has the same resolution as the second colour component. Supposing that the second preset proportion is ¼, the length of the reference column (that is, the total number of reference samples neighbouring the left side and the bottom left side) is 16, the value of K is 4. Supposing that the number of samples to be skipped which are close to one end of the reference column is the same as the number of samples to be skipped which are close to the other end of the reference column, in other words, ⅛ of reference samples, which are close to the starting position of the reference column, and ⅛ of reference samples, which are close to the ending position of the reference column, are skipped, that is, p=q=2. Therefore, foe each of the first colour component and the second colour component, positions corresponding to 2 consecutive reference samples are determined down from the topmost position of the reference column, and positions corresponding to 2 consecutive reference samples are determined up from the bottommost position of the reference column. Then the 4 reference samples thus determined are skipped. The remaining ¾ of reference samples (that is, 12 reference samples), which are located at middle positions of the reference column, constitute the second multiple neighbouring reference samples used for deriving model parameters α and β.

It can be understood that, in order to reduce redundancy between the first colour component and the second colour component, a CCLM prediction mode is adopted in VTM. For CCLM prediction modes such as an LM mode and an MDLM mode, the second colour component can be obtained by predicting a reconstructed value of the first colour component of the coding block. For example, a prediction model of equation (1) can be adopted.

$$\text{Pred}_C[i,j] = \alpha \cdot \text{Rec}_L[i,j] + \beta \quad (1)$$

i, j represent a position coordinate of a sample in the coding block, where i represents a horizontal direction, and j represents a vertical direction. $\text{Pred}_c[i, j]$ represents a prediction value of the second colour component corresponding to a sample at position [i, j] in the coding block. $\text{Rec}_L[i, j]$ represents a reconstructed value of the first colour component corresponding to the sample at position [i, j] of the coding block subjected to down-sampling. α and β are model parameters of the above prediction model.

Based on the obtained second set of neighbouring reference samples above, second model parameters α and β may be constructed in various manners. The second model parameters α and β may be constructed based on least squares regression, based on a maximum value and minimum value, or in other manners. The following will elaborate respectively construction of model parameters α and β based on least squares regression and based on the maximum value and minimum value.

In VVC, α and β may be derived according to a neighbouring reference value of the first colour component and a neighbouring reference value of the second colour component which correspond to a reference sample among the second multiple neighbouring reference samples, by using least-squares regression error. α and β may be derived according to the following equation (2).

$$\begin{cases} \alpha = \dfrac{2N \cdot \sum (L(n) \cdot C(n)) - \sum L(n) \cdot \sum C(n)}{2N \cdot \sum (L(n) \cdot L(n)) - \sum L(n) \cdot \sum L(n)} \\ \beta = \dfrac{\sum C(n) - \alpha \cdot \sum L(n)}{2N} \end{cases} \quad (2)$$

L(n) represents a neighbouring reference value of the first colour component corresponding to a reference sample among the second multiple neighbouring reference samples. C(n) represents a neighbouring reference value of the second colour component corresponding to the reference sample among the second multiple neighbouring reference samples. N is the number of samples of the second multiple neighbouring reference samples.

In VVC, by searching for a maximum neighbouring reference value of the first colour component and a minimum neighbouring reference value of the first colour component in the second multiple neighbouring reference samples, model parameters α and β may also be derived based on the principle that two points determine one line. α and β may be derived according to the following equation (3).

$$\begin{cases} \alpha = \dfrac{L_{max} - L_{min}}{C_{max} - C_{min}} \\ \beta = L_{min} - \alpha \cdot C_{min} \end{cases} \quad (3)$$

Figure 9:
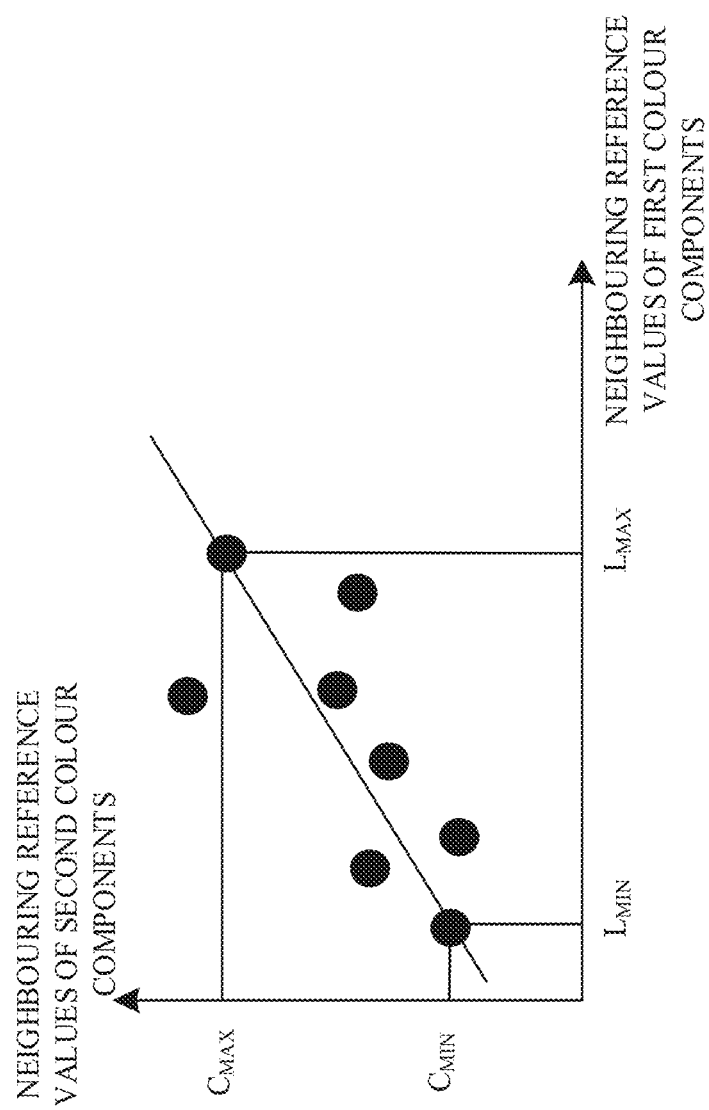
FIG. 9 is a schematic structural diagram illustrating construction of a prediction model for a coding block based on a maximum value and minimum value according to implementations.

$L_{max}$ and $L_{min}$ represent respectively a maximum value and a minimum value, which are obtained by searching among neighbouring reference values of first colour components corresponding to the second multiple neighbouring reference samples. $C_{max}$ represents a neighbouring reference value of the second colour component corresponding to a reference sample at a position corresponding to $L_{max}$, and $C_{min}$ represents a neighbouring reference value of the second colour component corresponding to a reference sample at a position corresponding to $L_{min}$. FIG. 9 is a schematic structural diagram illustrating construction of a prediction model for the coding block based on a maximum value and minimum value according to implementations. The horizontal coordinate represents neighbouring reference values of first colour components corresponding to the coding block. The vertical coordinate represents neighbouring reference values of second colour components corresponding to the coding block. Based on equation (3), model parameters α and β can be calculated according to $L_{max}$, $L_{min}$, $C_{max}$, and $C_{min}$. A prediction model is constructed as $C=\alpha*L+\beta$, where L represents a reconstructed value of the first colour component corresponding to a sample in the coding block, and C represents a prediction value of the second colour component corresponding to the sample of the coding block.

In some implementations, prediction decoding is performed on the coding block according to the second multiple neighbouring reference samples as follows. A first model parameter is determined according to the second multiple neighbouring reference samples. A first prediction model is established according to the first model parameter, where the first prediction model is representative of a prediction relationship between a first colour component and a second colour component corresponding to each sample of the coding block. Prediction decoding is performed on the coding block according to the first prediction model.

After the second multiple neighbouring reference samples are obtained, first model parameters α1 and β1 can be constructed according to equation (2) or equation (3). As such, the first prediction model can be established according to equation (1). Prediction decoding can be performed on the coding block according to the first prediction model. Since the second multiple neighbouring reference samples do not include reference samples which are close to the starting position and therefore are not that important, in addition to reducing search complexity, model parameters constructed according to the second multiple neighbouring reference samples can be more accurate, which can improve prediction decoding performance and on the other hand, improve compression efficiency of a video picture and thus decrease bit rate.

Alternatively, reference samples may be further determined from the obtained second multiple neighbouring reference samples at an equal interval or unequal intervals according to the sampling interval, to obtain third multiple neighbouring reference samples including the determined reference samples. Since the third multiple neighbouring reference samples include a smaller number of samples, search complexity can be further reduced.

In some implementations, before prediction decoding is performed on the coding block according to the second multiple neighbouring reference samples, the method further includes the following. Reference sample positions are determined according to a preset number of samples, based on the second multiple neighbouring reference samples. Based on the reference sample positions, reference samples at these reference sample positions are determined from the second multiple neighbouring reference samples, to obtain the third multiple neighbouring reference samples including the determined reference samples.

In one implementation, the reference sample positions in second multiple neighbouring reference samples are determined according to sampling intervals.

In one implementation, the sampling intervals are equal sampling intervals, and the reference sample positions in second multiple neighbouring reference samples are determined as follows. The reference sample positions in second multiple neighbouring reference samples are determined by performing uniform sampling on the second multiple neighbouring reference samples according to the equal sampling intervals, where the following expression is satisfied:

(start*PosN*+*pos*\*pickStep*N*)

where startPosN represents a start position of the reference sample positions, pos represents the determining procedure from position 0 to positon cntN−1 with variable cntN represents the preset number of samples, and pickStepN represents the equal sampling interval.

In one implementation, the sampling intervals are unequal sampling intervals, and the reference sample positions in second multiple neighbouring reference samples are determined as follows. The reference sample positions in second multiple neighbouring reference samples are determined by performing non-uniform sampling on the second multiple neighbouring reference samples according to the unequal sampling intervals.

In some implementations, prediction decoding is performed on the coding block according to the second multiple neighbouring reference samples as follows. A second model parameter is determined according to the third multiple neighbouring reference samples. A second prediction model is established according to the second model parameter, where the second prediction model is representative of a prediction relationship between a first colour component and a second colour component corresponding to each sample of the coding block. Prediction decoding is performed on the coding block according to the second prediction model.

The preset number of samples refers to the number of reference samples that is set in advance according to actual needs. The reference samples at the determined reference sample positions may be obtained by performing uniform sampling at a preset sampling interval on the second multiple neighbouring reference samples, or by performing non-uniform sampling at different preset sampling intervals on the second multiple neighbouring reference samples, which is determined according to actual needs in practice and is not limited herein.

In this way, the third multiple neighbouring reference samples can be obtained by performing uniform sampling or non-uniform sampling on the second multiple neighbouring reference samples. As such, second model parameters α2 and β2 can be constructed based on the third multiple neighbouring reference samples according to equation (2) or equation (3), and then the second prediction model can be established according to equation (1). Prediction decoding can be performed on the coding block according to the second prediction model. For the third multiple neighbouring reference samples, not only reference samples which are close to the starting position and are not that important have been skipped, but also importance and dispersity are taken into consideration, such that the third multiple neighbouring reference samples include a smaller number of samples, which further reduces search complexity. As such, model parameters constructed according to the second multiple neighbouring reference samples are relatively accurate, which improves prediction decoding performance, thereby decreasing bit rate.

The coding block may be a square coding block or a non-square coding block. In other words, implementations herein are applicable to both a square coding block and a non-square coding block, which is not limited herein.

According to the method provided herein, the first multiple neighbouring reference samples are obtained by acquiring neighbouring reference samples of the coding block, where the first multiple neighbouring reference samples include reference samples in the reference row or the reference column neighbouring the coding block. The positions corresponding to the K reference samples are determined from the starting position of the reference row or the reference column, where K is a positive integer. The second multiple neighbouring reference samples are obtained according to the determined positions corresponding to the K reference samples, where the second multiple neighbouring reference samples include neighbouring reference samples among the first multiple neighbouring reference samples. Prediction decoding is performed on the coding block according to the second multiple neighbouring reference samples. By means of obtaining the second multiple neighbouring reference samples to decrease the number of reference samples, it is possible to reduce search complexity, improve prediction decoding performance of a video picture, and thus decrease bit rate.

Figure 10:
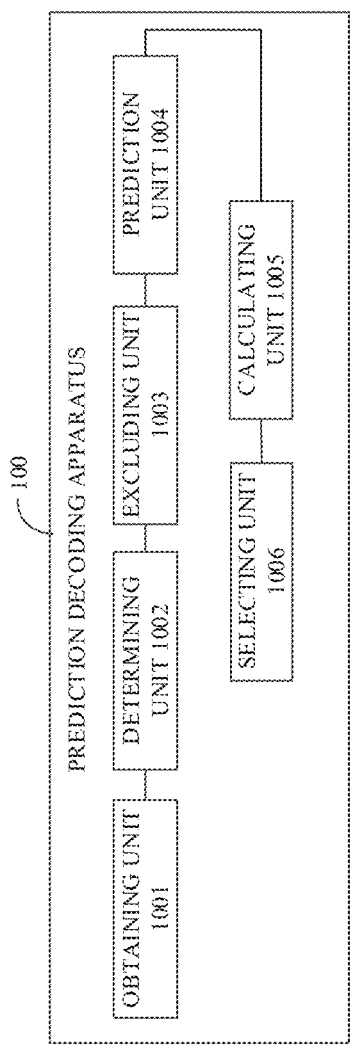
FIG. 10 is a schematic structural diagram of a prediction decoding apparatus according to implementations.

Based on the conception of the foregoing technical solutions illustrated in FIG. 4, FIG. 10 is a schematic structural diagram of a prediction decoding apparatus 100 according to implementations. The prediction decoding apparatus 100 includes an obtaining unit 1001, a determining unit 1002, an excluding unit 1003, and a prediction unit 1004. The obtaining unit 1001 is configured to obtain first multiple neighbouring reference samples by acquiring neighbouring reference samples of a coding block, where the first multiple neighbouring reference samples include reference samples in a reference row or a reference column neighbouring the coding block. The determining unit 1002 is configured to determine, from a starting position of the reference row or the reference column, positions corresponding to K reference samples, where K is a positive integer. The excluding unit 1003 is configured to obtain second multiple neighbouring reference samples according to the determined positions corresponding to the K reference samples, where the second multiple neighbouring reference samples include neighbouring reference samples among the first multiple neighbouring reference samples. The prediction unit 1004 is configured to perform prediction decoding on the coding block according to the second multiple neighbouring reference samples.

In some implementations, a prediction mode of the coding block is an MDLM prediction mode, where the MDLM prediction mode includes an MDLM_A mode and an MDLM_L mode.

In some implementations, as illustrated in FIG. 10, the prediction decoding apparatus 100 further includes a calculating unit 1005. The calculating unit 1005 is configured to, in the MDLM_A mode, calculate a value of K according to a length of the reference row and a first preset proportion, where the first preset proportion corresponds to the reference row, or in the MDLM_L mode, calculate the value of K according to a length of the reference column and a second preset proportion, where the second preset proportion corresponds to the reference column.

In some implementations, the calculating unit is further configured to, in the MDLM_A mode, calculate the value of K according to a length of a top side of the coding block and the first preset proportion, or in the MDLM_L mode, calculate the value of K according to a length of a left side of the coding block and the second preset proportion.

In some implementations, the determining unit 1002 is configured to, in the MDLM_A mode, determine, from a leftmost position of the reference row to the right, positions corresponding to K consecutive reference samples, or in the MDLM_L mode, determine, down from a topmost position of the reference column, positions corresponding to K consecutive reference samples.

In some implementations, the determining unit 1002 is further configured to operate as follows in the MDLM_A mode. The determining unit 1002 is configured to determine, from a leftmost position of the reference row to the right, positions corresponding to i consecutive reference samples. The determining unit 1002 is configured to determine, from a rightmost position of the reference row to the left, positions corresponding to j consecutive reference samples, where 1 and j=K−1.

In other implementations, the determining unit 1002 is further configured to operate as follows in the MDLM_L mode. The determining unit 1002 is configured to determine, down from a topmost position of the reference column, positions corresponding to p consecutive reference samples. The determining unit 1002 is configured to determine, up from a bottommost position of the reference column, positions corresponding to q consecutive reference samples, where $1 \leq p < K$, and $q=K-p$.

In some implementations, the determining unit 1002 is further configured to determine a first model parameter according to the second multiple neighbouring reference samples. The prediction unit 1004 is configured to operate as follows. The prediction unit 1004 is configured to establish a first prediction model according to the first model parameter, where the first prediction model is representative of a prediction relationship between a first colour component and a second colour component corresponding to each sample of the coding block. The prediction unit 1004 is configured to perform prediction decoding on the coding block according to the first prediction model.

In some implementations, as illustrated in FIG. 10, the prediction decoding apparatus 100 further includes a selecting unit 1006. The selecting unit 1006 is configured to operate as follows. The selecting unit 1006 is configured to determine, according to a preset number of samples, positions corresponding to reference samples to-be-selected, based on the second multiple neighbouring reference samples. The selecting unit 1006 is configured to select, according to the positions corresponding to reference samples to-be-selected, reference samples corresponding to the positions from the second multiple neighbouring reference samples, to obtain third multiple neighbouring reference samples including the selected reference samples.

In some implementations, the determining unit 1002 is further configured to determine a second model parameter according to the third multiple neighbouring reference samples. The prediction unit 1004 is configured to operate as follows. The prediction unit 1004 is configured to establish a second prediction model according to the second model parameter, where the second prediction model is representative of a prediction relationship between a first colour component and a second colour component corresponding to each sample of the coding block. The prediction unit 1004 is configured to perform prediction decoding on the coding block according to the second prediction model.

It can be understood that, in implementations herein, "unit" may be part of a circuit, part of a processor, part of a program or software, and the like. "Unit" may be modular or non-modular. In addition, various components described herein may be integrated into one processing unit or may be present as a number of physically separated units, and two or more units may be integrated into one. The integrated unit may take the form of hardware or a software functional unit.

If the integrated units are implemented as software functional modules and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium may include various kinds of media that can store program codes, such as a universal serial bus (USB) flash disk, a mobile hard drive, a read only memory (ROM), a random access memory (RAM), a magnetic disk, or an optical disk.

Therefore, implementations provide a computer storage medium. The computer storage medium is configured to store programs for prediction decoding which, when executed by at least one processor, are operable with the at least one processor to perform the foregoing method illustrated in FIG. 4.

Figure 11:
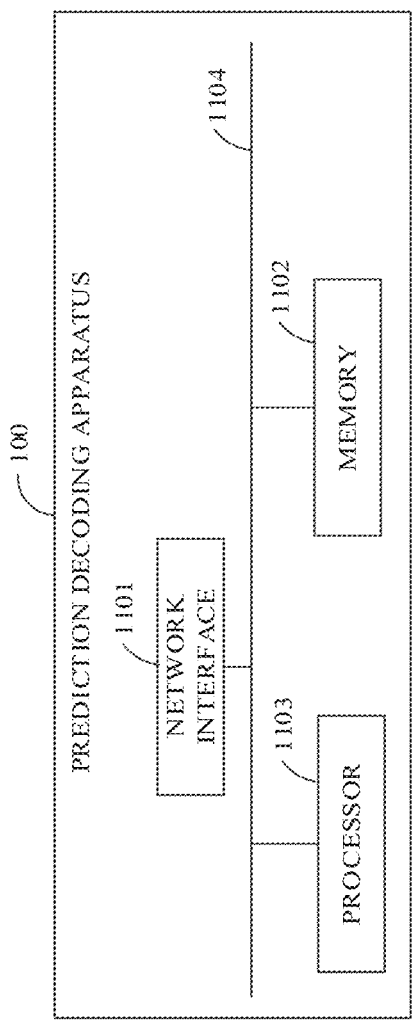
FIG. 11 is a schematic structural diagram of hardware of a prediction decoding apparatus according to implementations.

Based on the prediction decoding apparatus 100 and the computer storage medium described above, FIG. 11 is a schematic structural diagram of hardware of a prediction decoding apparatus 100 according to implementations. The prediction decoding apparatus 100 includes a network interface 1101, a memory 1102, and a processor 1103. Various components are coupled together via a bus system 1104. It can be understood that, the bus system 1104 is configured for connection and communication between these components. In addition to a data bus, the bus system 1104 further includes a power bus, a control bus, and a status signal bus. However, for the clarity of description, various buses are marked as the bus system 1104 in FIG. 11.

The network interface 1101 is configured to receive and send a signal while receiving and sending information with other external network elements. The memory 1102 is configured to store computer programs executable by the processor 1103. The processor 1103, when running the computer programs, is configured to perform: obtaining first multiple neighbouring reference samples by acquiring neighbouring reference samples of a coding block, where the first multiple neighbouring reference samples include reference samples in a reference row or a reference column neighbouring the coding block; determining, from a starting position of the reference row or the reference column, positions corresponding to K reference samples, where K is a positive integer; obtaining second multiple neighbouring reference samples according to the determined positions corresponding to the K reference samples, where the second multiple neighbouring reference samples include neighbouring reference samples among the first multiple neighbouring reference samples; and performing prediction decoding on the coding block according to the second multiple neighbouring reference samples.

It can be understood that, the memory 1102 of implementations may be a volatile memory or a non-volatile memory, or may include both the volatile memory and the non-volatile memory. The non-volatile memory may be a ROM, a programmable read only memory (programmable ROM, PROM), an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDRSDRAM), an enhanced synchronous dynamic random access memory (ESDRAM), a synchronous link dynamic random access memory (synch-link DRAM, SLDRAM), and a direct rambus random access memory (direct rambus RAM, DRRAM). The memory 1102 of the systems and methods described herein is intended to include, but is not limited to, these and any other suitable types of memory.

The processor 1103 may be an integrated circuit chip with signal processing capabilities. During implementation, each step of the foregoing method may be completed by an integrated logic circuit of hardware in the processor 1103 or an instruction in the form of software. The processor 1103 may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general-purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a RAM, a flash memory, a ROM, a PROM, or an electrically erasable programmable memory, registers, and the like. The storage medium is located in the memory 1102. The processor 1103 reads the information in the memory 1102, and completes the steps of the method described above with the hardware thereof.

It will be appreciated that implementations described herein can be implemented in one or more of hardware, software, firmware, middleware, and microcode. For hardware implementation, the processing unit can be implemented in one or more ASICs, DSPs, DSP devices (DSPD), programmable logic devices (PLD), FPGAs, general-purpose processors, controllers, microcontrollers, microprocessors, other electronic units for performing the functions described herein or a combination thereof.

For a software implementation, the technology described herein can be implemented by modules (e.g., procedures, functions, and so on) for performing the functions described herein. The software code can be stored in the memory and executed by the processor. The memory can be implemented in the processor or external to the processor.

The processor 1103, when running the computer programs, is configured to perform the foregoing method described in FIG. 4.

Technical solutions described in various implementations can be combined with each other without conflict.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

INDUSTRIAL APPLICABILITY

Implementations provide a prediction decoding method. First multiple neighbouring reference samples of a coding block are determined, where the first multiple neighbouring reference samples include reference samples in a reference row or a reference column neighbouring the coding block. Positions corresponding to K reference samples are determined from a starting position of the reference row or the reference column, where K is a positive integer. Second multiple neighbouring reference samples are determined according to the determined positions corresponding to the K reference samples, where the second multiple neighbouring reference samples include neighbouring reference samples among the first multiple neighbouring reference samples. Prediction decoding is performed on the coding block according to the second multiple neighbouring reference samples. Since the second multiple neighbouring reference samples are obtained by not considering, among the first multiple neighbouring reference samples, reference samples which are close to the starting position and therefore are not that important, a model parameter(s) constructed according to the second multiple neighbouring reference samples is relatively accurate, which improves prediction decoding performance. In addition, the number of samples of the second multiple neighbouring reference samples is small, which is possible to reduce search complexity, and on the other hand, improve compression efficiency of a video picture and thus decrease bit rate.

What is claimed is:

1. A prediction decoding method, comprising:
   determining first multiple neighbouring reference samples of a coding block, wherein the first multiple neighbouring reference samples comprise reference samples in a reference row or a reference column neighbouring the coding block;
   determining, from a starting position of the reference row or the reference column, positions corresponding to K reference samples, wherein K is a positive integer;
   determining second multiple neighbouring reference samples according to the determined positions corresponding to the K reference samples, wherein the second multiple neighbouring reference samples comprise neighbouring reference samples among the first multiple neighbouring reference samples, wherein reference sample positions for the second multiple neighbouring reference samples are determined based on equal sampling intervals; and
   performing prediction decoding on the coding block according to the second multiple neighbouring reference samples,
   wherein the method further comprises:
   for the reference row, determining a value of K according to a length of the reference row and a first preset proportion, wherein the first preset proportion corresponds to the reference row; or
   for the reference column, determining the value of K according to a length of the reference column and a second preset proportion, wherein the second preset proportion corresponds to the reference column.

2. The method of claim 1, wherein a prediction mode of the coding block is a multi-directional linear model (MDLM) prediction mode, wherein the MDLM prediction mode comprises an MDLM_A mode and an MDLM_L mode.

3. The method of claim 1, further comprising:
   for the reference row, determining the value of K according to a length of a top side of the coding block and the first preset proportion; or
   for the reference column, determining the value of K according to a length of a left side of the coding block and the second preset proportion.

4. The method of claim 1, wherein determining, from the starting position of the reference row or the reference column, the positions corresponding to the K reference samples comprises:
   for the reference row, determining, from a leftmost position of the reference row to the right, positions corresponding to K consecutive reference samples; or
   for the reference column, determining, down from a topmost position of the reference column, positions corresponding to K consecutive reference samples.

5. The method of claim 1, further comprising:
   determining the reference sample positions according to a preset number of samples, based on the second multiple neighbouring reference samples; and
   determining, according to the reference sample positions, reference samples corresponding to the reference sample positions from the second multiple neighbouring reference samples, to obtain third multiple neighbouring reference samples comprising the determined reference samples.

6. The method of claim 5, wherein performing prediction decoding on the coding block according to the second multiple neighbouring reference samples comprises:
   determining a second model parameter according to the third multiple neighbouring reference samples;
   establishing a second prediction model according to the second model parameter, wherein the second prediction model is representative of a prediction relationship between a first colour component and a second colour component corresponding to the coding block; and
   performing prediction decoding on the coding block according to the second prediction model.

7. The method of claim 5, wherein determining reference sample positions according to a preset number of samples comprises:
   determining the reference sample positions in second multiple neighbouring reference samples according to the equal sampling intervals.

8. The method of claim 7, wherein determining the reference sample positions in second multiple neighbouring reference samples according to sampling intervals comprises:
determining the reference sample positions in second multiple neighbouring reference samples by performing uniform sampling on the second multiple neighbouring reference samples according to the equal sampling intervals according to the following requirement:

(start*PosN*+*pos*\*pickStep*N*)

wherein startPosN represents a start position of the reference sample positions, pos represents the determining procedure from position 0 to position cntN-1 with variable cntN represents the preset number of samples, and pick StepN represents the equal sampling interval.

9. The method of claim 7, wherein the sampling intervals are unequal sampling intervals, determining the reference sample positions in second multiple neighbouring reference samples according to sampling intervals comprises:
determining the reference sample positions in second multiple neighbouring reference samples by performing non-uniform sampling on the second multiple neighbouring reference samples according to the unequal sampling intervals.

10. The method of claim 2, wherein the MDLM_A mode is INTRA_T_CCLM mode, and the MDLM_L mode is INTRA_L_CCLM mode.

11. The method of claim 10, wherein in the INTRA_T_CCLM mode, the reference row neighbouring the coding block refers to an above neighbouring row of the coding block, in the INTRA_L_CCLM mode, the reference column neighbouring the coding block refers a left neighbouring row of the coding block.

12. The method of claim 1, wherein each reference sample corresponds to a luma position, the neighbouring reference samples comprises above neighbouring samples and left neighbouring reference samples.

13. A prediction decoding apparatus, comprising:
a processor; and
a memory configured to store computer programs which, when executed by the processor, are operable with the processor to:
determine first multiple neighbouring reference samples of a coding block, wherein the first multiple neighbouring reference samples comprise reference samples in a reference row or a reference column neighbouring the coding block;
determine, from a starting position of the reference row or the reference column, positions corresponding to K reference samples, wherein K is a positive integer;
determine second multiple neighbouring reference samples according to the determined positions corresponding to the K reference samples, wherein the second multiple neighbouring reference samples comprise neighbouring reference samples among the first multiple neighbouring reference samples, wherein reference sample positions for the second multiple neighbouring reference samples are determined based on equal sampling intervals; and
perform prediction decoding on the coding block according to the second multiple neighbouring reference samples,
wherein the processor is configured to:
for the reference row, determine a value of K according to a length of the reference row and a first preset proportion, wherein the first preset proportion corresponds to the reference row; or
for the reference column, determine the value of K according to a length of the reference column and a second preset proportion, wherein the second preset proportion corresponds to the reference column.

14. The apparatus of claim 13, wherein the processor is configured to:
for the reference row, determine the value of K according to a length of a top side of the coding block and the first preset proportion; or
for the reference column, determine the value of K according to a length of a left side of the coding block and the second preset proportion.

15. The apparatus of claim 13, wherein the processor is further configured to:
determine the reference sample positions according to a preset number of samples, based on the second multiple neighbouring reference samples; and
determine, according to the reference sample positions, reference samples corresponding to the reference sample positions from the second multiple neighbouring reference samples, to obtain third multiple neighbouring reference samples comprising the determined reference samples.

16. The apparatus of claim 15, wherein the processor configured to perform prediction decoding on the coding block according to the second multiple neighbouring reference samples is configured to:
determine a second model parameter according to the third multiple neighbouring reference samples;
establish a second prediction model according to the second model parameter, wherein the second prediction model is representative of a prediction relationship between a first colour component and a second colour component corresponding to the coding block; and
perform prediction decoding on the coding block according to the second prediction model.

17. The apparatus of claim 13, wherein a prediction mode of the coding block is a multi-directional linear model (MDLM) prediction mode, wherein the MDLM prediction mode comprises an MDLM_A mode and an MDLM_L mode.

18. A non-transitory computer readable storage medium storing program codes which, when executed by a computer, are operable with the computer to perform the following operations:
determining first multiple neighbouring reference samples of a coding block, wherein the first multiple neighbouring reference samples comprise reference samples in a reference row or a reference column neighbouring the coding block;
determining, from a starting position of the reference row or the reference column, positions corresponding to K reference samples, wherein K is a positive integer;
determining second multiple neighbouring reference samples according to the determined positions corresponding to the K reference samples, wherein the second multiple neighbouring reference samples comprise neighbouring reference samples among the first multiple neighbouring reference samples, wherein reference sample positions for the second multiple neighbouring reference samples are determined based on equal sampling intervals; and
performing prediction decoding on the coding block according to the second multiple neighbouring reference samples, wherein the operations further include:
- for the reference row, determine a value of K according to a length of the reference row and a first preset proportion, wherein the first preset proportion corresponds to the reference row; or
- for the reference column, determine the value of K according to a length of the reference column and a second preset proportion, wherein the second preset proportion corresponds to the reference column.

\* \* \* \* \*